No. 757,904. PATENTED APR. 19, 1904.
F. FREDEEN.
COMBINED GRAIN THRESHER AND SEPARATOR.
APPLICATION FILED MAY 5, 1903.
NO MODEL. 6 SHEETS—SHEET 1.

No. 757,904. PATENTED APR. 19, 1904.
F. FREDEEN.
COMBINED GRAIN THRESHER AND SEPARATOR.
APPLICATION FILED MAY 5, 1903.
NO MODEL. 6 SHEETS—SHEET 3.

WITNESSES
INVENTOR
Frank Fredeen,
BY Munn & Co.
ATTORNEYS.

No. 757,904. PATENTED APR. 19, 1904.
F. FREDEEN.
COMBINED GRAIN THRESHER AND SEPARATOR.
APPLICATION FILED MAY 5, 1903.
NO MODEL. 6 SHEETS—SHEET 6.

WITNESSES: INVENTOR
ATTORNEYS.

No. 757,904. Patented April 19, 1904.

UNITED STATES PATENT OFFICE.

FRANK FREDEEN, OF TAYLORS FALLS, MINNESOTA.

COMBINED GRAIN THRESHER AND SEPARATOR.

SPECIFICATION forming part of Letters Patent No. 757,904, dated April 19, 1904.

Application filed May 5, 1903. Serial No. 155,735. (No model.)

*To all whom it may concern:*

Be it known that I, FRANK FREDEEN, a citizen of the United States, and a resident of Taylors Falls, in the county of Chisago and State of Minnesota, have invented certain new and useful Improvements in a Combined Grain Thresher and Separator, of which the following is a specification.

My invention is an improvement in that class of threshing and separating machines in which a series of horizontal tooth-bars are connected with transverse crank-shafts in such manner that they receive the combined up-and-down and forward-and-back movement, whereby the mingled straw and grain received from the threshing-cylinder are conveyed rearward and the grain separated from the straw in the course of its progress.

The improvements consist of certain features of construction, arrangement, and combination of parts, as hereinafter described and claimed, the same being illustrated in accompanying drawings, in which—

Fig. 4 is a vertical section of one of the beater and rake bars with its supporting finger or holder.
Figs. 5 and 5ª are views representing modifications.
Fig. 8 is an enlarged vertical section on the line 8 8 of Fig. 9, the same illustrating the connection of the outside rake and beater bars with the eccentrics or cranks, together with the shanks whereon the latter are mounted.

Referring in the first instance to Figs. 1, 2, 3, 1 indicates the casing of the machine, which is suitably mounted upon wheels in the usual way. A toothed cylinder 2 is arranged in the usual manner at the front end of the casing 1 and provided with a concave 3, having a grate distinguished by certain novel features of construction and arrangement—that is to say, the front portion of the concave is provided with a slot in which a grate-bar is arranged, and a grate 4 extends upward and rearward, as shown in Fig. 2, the same being composed of transverse parallel bars, which are convex on the upper or rear side and concave on the under or front side. These bars are arranged a suitable distance apart to allow the passage of grain freely; but the curved shape of the bars retards or hinders the passage of unthreshed heads of grain. As indicated, the grate 4 extends upward to such a height that it is in the same horizontal plane with the shaft of the threshing-cylinder 2. It thus forms an extended friction-surface over which the grain is compelled to pass. The acute angles formed by the edges of the cross-bars of the grate serve to catch the kernels and detach them from the heads in a manner which is not practicable with the old form of grate. The upward extension of the grate enables it to prevent the passage of unthreshed heads of grain directly from the cylinder into the space above the conveyer.

Figure 2:
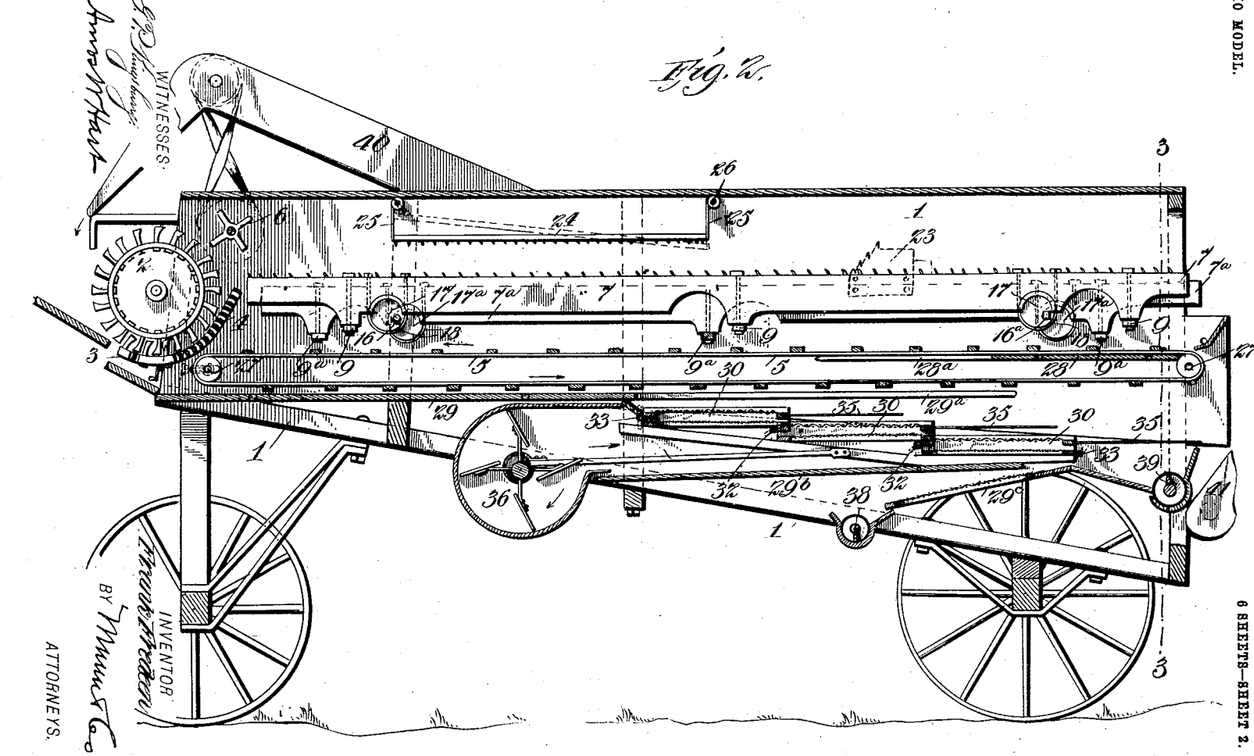
Fig. 2 is a central longitudinal vertical section of the same.
Figure 3:
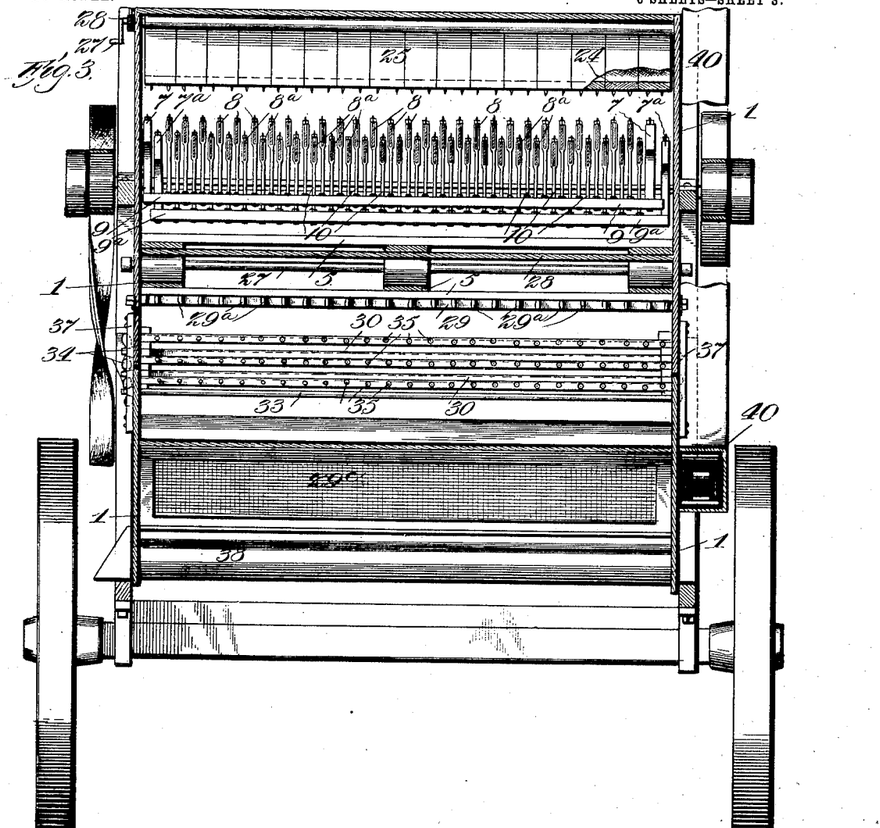
Fig. 3 is a vertical transverse section on the line 3 3 of Fig. 2.
Figures 4, 5:
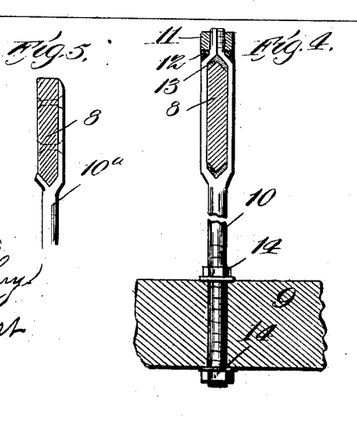
Figure 5A:
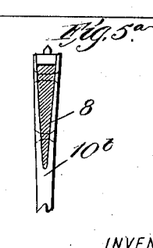
Figure 7:
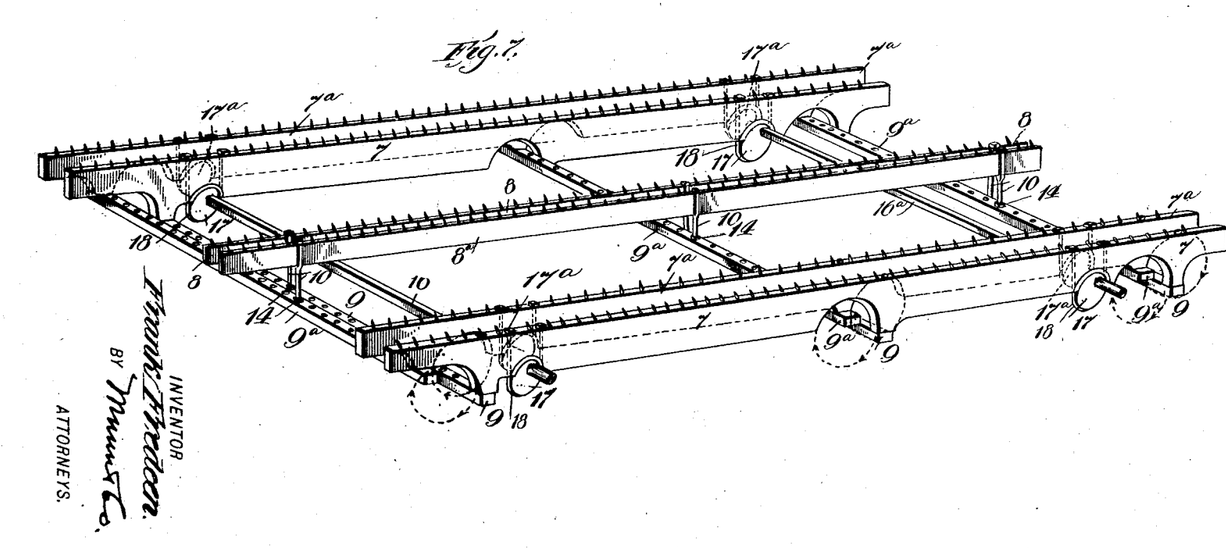
Fig. 7 is a perspective view illustrating the principle features of the combined beater and rake.

A rotary beater 6 is constructed and arranged in the usual manner above and between the cylinder 2 and the combined beater and rake mechanism. The construction of the latter is as follows: The main feature of the same is the arrangement of two frames or sets of frames, each of which is composed (see Figs. 3 and 7) of parallel toothed bars and connecting cross-bars. The numbers 7 and 8 indicate the side and intermediate rake and beater bars of one frame, and the numerals 7ª and 8ª indicate the corresponding rake and beater bars of the other frame, while the numerals 9 indicate the cross-bars which connect the side rake and beater bars 7, and the numerals 9ª similarly indicate the cross-bars which connect the other side bars 7ª. The cross-bars 9 and 9ᵃ are secured to the corresponding side bars 7 and 7ᵃ by means of bolts passing directly through them. The small intermediate bars 8 and 8ᵃ are supported by means of fingers or posts 10, which are preferably constructed of iron or steel. As indicated in Fig. 4, the finger is bifurcated or forked, the two arms of the same passing up on opposite sides of the bar 8 and the upper ends of the same being suitably constructed to form a solid cylinder which is threaded to adapt it to receive a nut 11. A washer 12 is interposed between the nut and the sloping shoulders of the fork. Washers 13 are also interposed between the bar 8 and the upper and lower ends of the fork. By this means I provide not only for tightening the bar 8 when required, but also for removal and substitution in case of necessity. Fingers or posts 10 have threaded shanks, which are inserted through holes in the cross-bars 9 and 9ᵃ, and nuts 14 are applied above and below the latter for holding the fingers securely in place and at the same time providing for their convenient detachment if necessity should arise. The upper edges of the several parallel bars 7 and 8 and 7ᵃ and 8ᵃ are provided with teeth which are inclined toward the front, whereby they are adapted to take hold of the straw and to release it without difficulty. The several rake and beater bars 7 and 7ᵃ and 8 and 8ᵃ are provided so as to work practically as close together as possible. The smaller bars are about one-fourth inch thick and may range from two to six inches in width. The holes formed in the cross-bars 9 and 9ᵃ to receive the fingers 10 are preferably formed about one inch apart. As shown in Fig. 7 three cross-bars 9 connect each set of side bars 7 and support intermediate bars 8, while similar cross-bars 9ᵃ connect the side bars 7ᵃ and support the intermediate bars 8ᵃ. As shown in Figs. 2 and 7, the side bars are cut out adjacent to the finger-supporting bars 9ᵃ, while the corresponding side bars 7ᵃ are similarly cut out to accommodate the finger-bars 9, and the latter are arranged adjacent to but in rear of the bars 9ᵃ.

Figure 8:
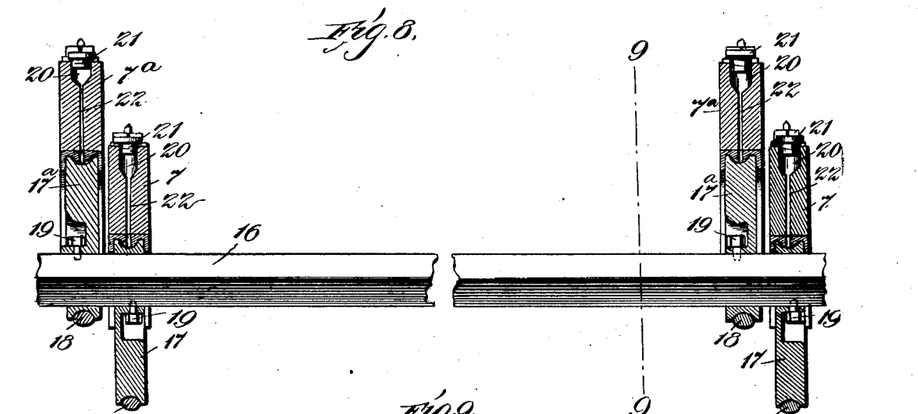
Figure 9:
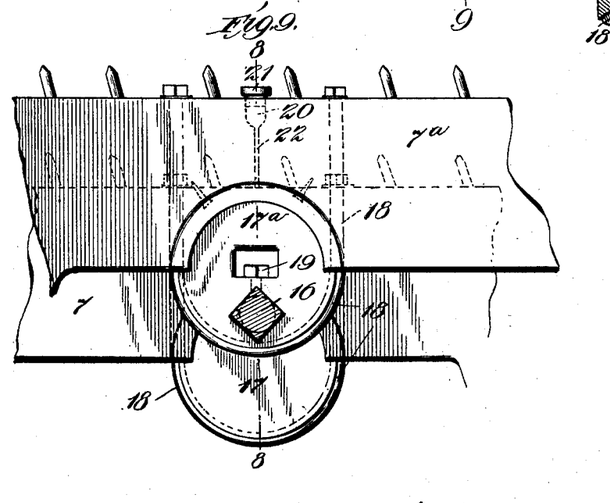
Fig. 9 is a vertical cross-section on the line 9 9 of Fig. 8.

The means for supporting and operating the rake and beater bars are two parallel rotary shafts 16 and 16ᵃ, which are suitably journaled in the sides of the casing 1 and each provided with two pairs of eccentrics 17 and 17ᵃ. The said shafts are located on the inner sides of the front and rear finger-supporting bars 9 and 9ᵃ, and the thick side bars 7 and 7ᵃ are cut out or provided with semicircular notches in the under side to receive the respective eccentrics 17 and 17ᵃ. As shown in Fig. 9, the bars 7 and 7ᵃ are secured to the eccentrics by means of U-shaped screw-bolts 18, the same passing up through the bars and being provided with screw-nuts secured to their upper ends, as shown. The shafts 16 and 16ᵃ are squared or of other preferred polygonal form in cross-section and the eccentrics are secured thereto by means of clamp-screws 19, (see Fig. 8,) which are arranged in cavities or recesses provided with the eccentrics. Figs. 8 and 9 also illustrate a provision for oil supplied to the eccentrics, cups 20 being formed in the upper edges of the bars 7 and 7ᵃ and provided with screw-stoppers 21, where ducts 22 lead downward, as shown.

From the before-described construction and arrangement of the rake and beater mechanism it will be seen that the parts 7 8 9 constitute one portion thereof and the parts 7ᵃ, 8ᵃ, and 9ᵃ constitute a duplicate portion and that the two are arranged so that the several bars of the one frame intermesh or are interposed between those of the other frame; further, that the rotary shafts 16 and 16ᵃ, with their oppositely-projecting eccentrics, impart a practically rotary motion to the two sets of frames simultaneously, so that one rises and moves rearward, then downward and forward and upward as the other is moving in the opposite direction. In other words, the bars 7 and 8 rise and move rearward as the bars 7ᵃ and 8ᵃ descend and move forward. Each set of bars as it rises strikes and beats the straw, thus dislodging grain, and in this rearward movement they carry a layer or stratum of straw with them, so that the straw is practically fed rearward continuously. Owing to the great number of bars which my system permits me to employ a greater quantity of straw is moved rearward in a given space of time or toward the straw-carrier than is practicable with the ordinary arrangement heretofore employed. Further, by the arrangement of parts shown I form a more compact rake and beater mechanism than is otherwise practicable, and the shafts and their eccentrics are also arranged closer to the said bars than in other arrangements heretofore adopted. By reason of the two qualities of economy of space and the increased number of the rake and beater bars proper, whereby the straw is fed rearward more rapidly than heretofore, I am enabled to make the casing 1 of the machine smaller than heretofore—that is to say, narrower and of less height. Thus a considerable economy of size, weight, and cost is effected.

Figures 10, 11:
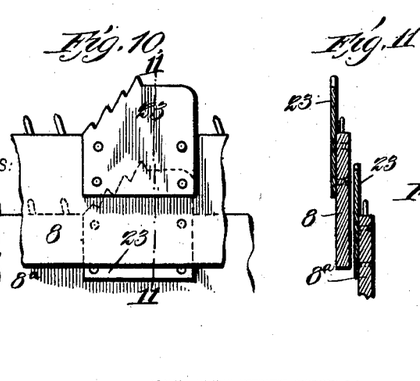
Fig. 10 is a detail side view illustrating attachments of the rake and beater bars for assisting in the separation of mingled straw and grain while passing over them.
Fig. 11 is a cross-section on the line 11 11 of Fig. 10.

As shown in Figs. 2, 10, and 11, metal plates 23 are secured by rivets or other suitable means to the sides of the beater-bars, the same being sloped or inclined rearward on the front upper edge and also provided with teeth on such inclined part, and being extended horizontally at the top in rear of the incline, whereby the plates are adapted to take up mingled straw and grain, the straw being then momentarily supported by the rear or top horizontal portions of the plates while passing rearward. In brief, the plates first lift the straw and grain, then temporarily support the straw, so that the grain may be more effectively dislodged or separated from the straw.

In the operation of the rake and beater mechanism before described the greater part of the grain mingled with the straw is dislodged and falls through the spaces between the rakes onto the endless traveling conveyer 5, (see Fig. 2;) but to perfect this operation and to cause dislodgment of any grain that might be otherwise carried along with the straw I employ a supplemental overhead beater 24. The same consists (see Figs. 2 and 3) of a series of parallel slats which are attached to and supported by aprons 25, whose lower portions are slitted, so as practically to form independent strips which are separately connected with the several slats. These aprons are wound upon shafts 26, which are journaled in the sides of the casing which is contiguous to the top thereof and provided with a crank 27 and ratchet and pawl 28. All the slats are toothed or notched on their under sides in order to more effectually engage or have due friction with the straw thrown up by the rakes and beaters. It is apparent that by the construction of the overhead beater 24 it is adapted to yield or rise bodily or as a whole and that its several slats will also yield individually, so that the beater accommodates itself flexibly to the upward pressure of the straw as the latter is carried rearward by the rakes. In order that the straw may not be obstructed in entering between the overhead beater and the rakes and beaters proper, the front end of the former is preferably raised so that the beater 24 as a whole occupies an inclined position, as indicated by dotted lines, Fig. 2.

Figure 12:
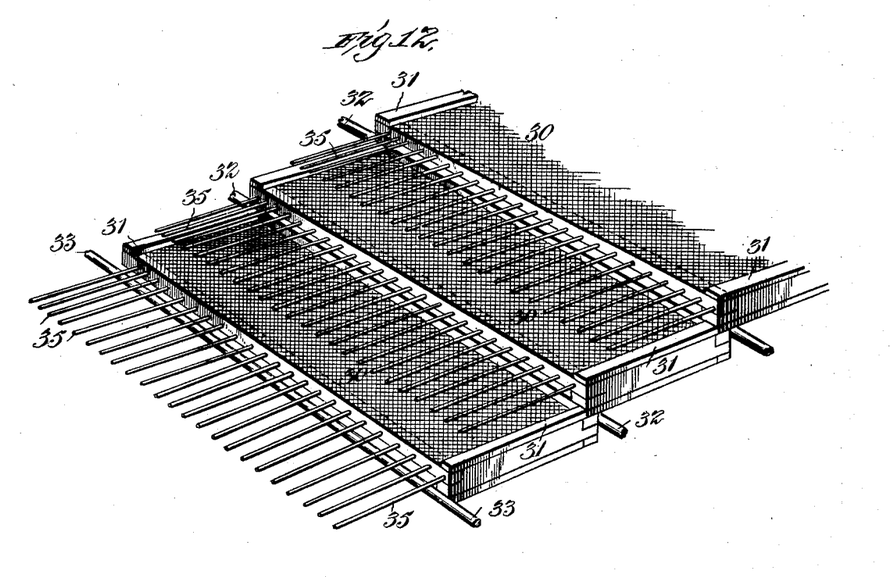
Fig. 12 is a perspective view illustrating the arrangement of the sieves and their attachments.
Figure 13:
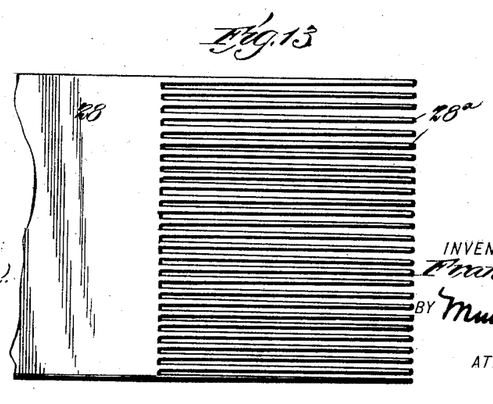
Fig. 13 is a plan view of one of the grain-boards, provided with tapering fingers.

The endless traveling conveyer 5 may be constructed in the ordinary way. It is mounted upon two transverse shafts 27 27ª, arranged at the front and rear ends, respectively, of the casing 1. The front shaft 27 is provided with means for adjusting it to regulate the tension of the conveyer. Beneath the upper bight of the conveyer and adjacent to the rear shaft 27ª is arranged a grain-board 28, which is provided with forwardly-extending fingers 28ª, the same being tapered, as shown in Fig. 13. Beneath the front portion of the conveyer 5 is also arranged a grain-board 29, which is similarly provided with tapered fingers 29ª, the latter extending rearward to near the front edge of the overhead grain-board 28. It will be seen (see Fig. 13) that by the taper of the fingers of these grain-boards the space between them gradually widens from their butts to their points, which provides for the gradual downward discharge of grain as the same is passed over the fingers— that is to say, the smaller kernels will pass down first and the larger ones will pass down later, while the largest will either pass down between the ends of the fingers or over their ends, as the case may be. By this means the grain is not delivered in a body or at one point, but distributed over a comparately wide area. This is particularly advantageous to the distribution of grain on the sieves 30, which are arranged in series and stepwise below the fingers 29ª of the lower grain-board 29. As shown in Figs. 2 and 12, three sets of sieves are employed, the same being supported upon side cleats attached to the sides of the shoe or shaker and the rear ends of the two upper sieves resting upon the adjacent ends of those next below and being prevented from endwise motion by abutting strips 31, secured to the two lower sieves, as indicated in Fig. 12. Rods 32 are arranged below the two front sieves, and rods 33 are arranged opposite the ends of the front and rear sieves, respectively, and nuts 34 are applied to their ends, (see Fig. 1,) whereby the sides of the shoe may be drawn into close contact with the sides of the sieves, so as to hold them firmly in place. Fingers 35 (see Figs. 2 and 12) project from the two upper sieves over those next below for the purpose of aiding in dislodgment of the grain from the straw and other material passing over the sieves. A blower 36 (see Figs. 1 and 2) is arranged in the usual way at the front end of the shoe, and an eccentric on its shaft is connected by a rod with the shoe, so that the latter receives a vibratory motion, as usual in this class of machines. The shoe is supported by springs 37, (see Fig. 1,) which tend to press it rearward and upward. The grain is delivered to a screw conveyer 38, (see Fig. 2,) and the unthreshed portion is delivered to another conveyer 39, by which it is delivered into an elevator 40 and reconveyed to the threshing-cylinder in the usual manner. A grain-board 29ᵇ (see Fig. 2) extends horizontally from the blower beneath the several sieves 30, its rear end terminating at a point midway of the lowest and last sieve of the series and also midway of the inclined sieve 29ᶜ. The said grain-board receives nearly all the grain that falls through the sieves, and by the blast and movement of the shoe such grain is carried along and delivered upon the sieve 29ᶜ, so that it is properly screened before passing to the conveyer 38.

A straw-carrier 41 is to be connected in the usual way with the rear end of the casing 1.

Figure 1:
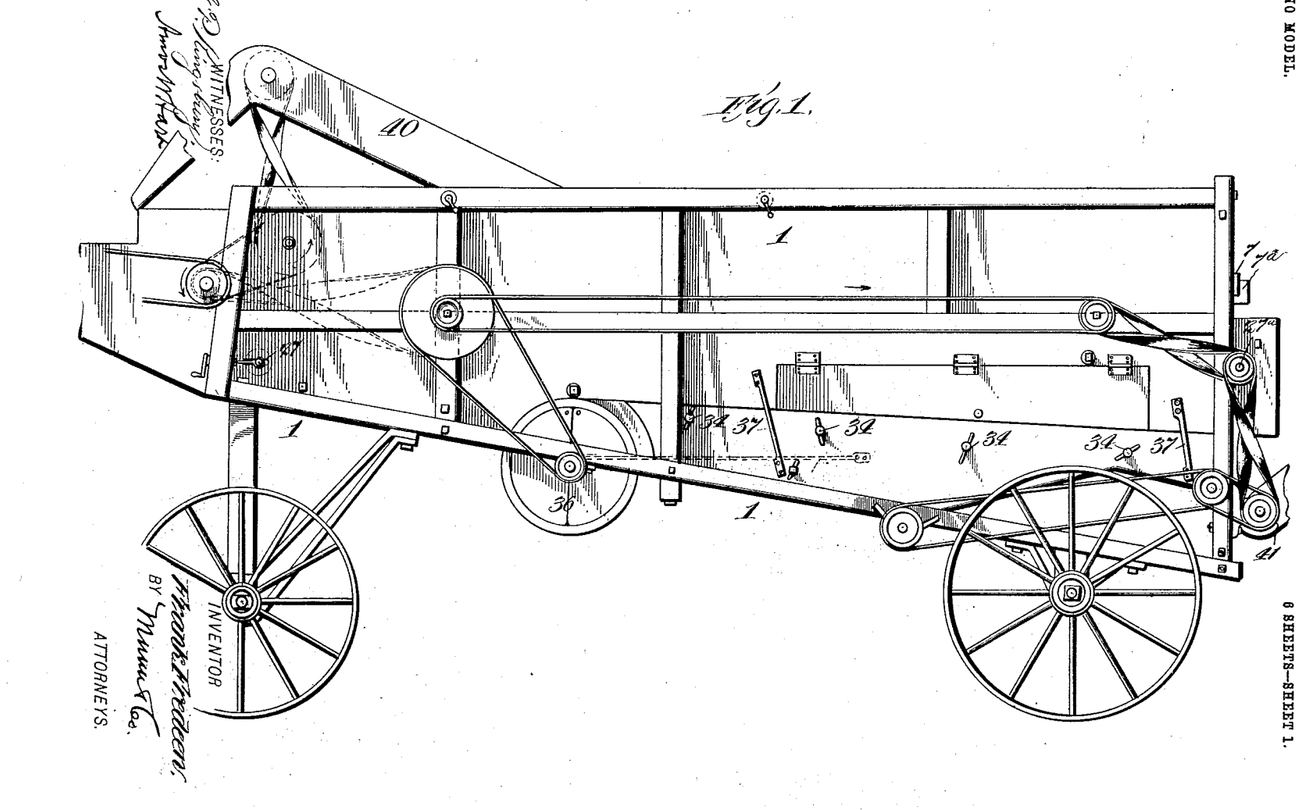
Figure 1 is a side elevation of my improved machine.

The arrangement of belts and pulleys for operating the several rotary shafts or other parts of the machine is sufficiently indicated in Fig. 1.

The cross-bars 9 and 9ª and the fingers 10, supporting the small rake-bars 8 and 8ª, may be constructed integrally of metal, preferably malleable cast-iron, preserving practically the same form and proportions as when constructed as shown in the drawings.

In Fig. 5 I illustrate a modification in the construction and attachment to the slats 8 and 8ª of the fingers employed for supporting the latter. In this case the finger 10ª is not forked, but provided with a shoulder adapted to engage the lower edge of a slat 8 and extended upward on one side of the latter and riveted thereto. In Fig. 5ª I show another modification, in which the finger 10ᵇ is bifurcated; but the two forks are riveted to the bar, which is wedge-shaped in cross-section. A block provided with a tooth is arranged on the upper side of the bar.

Figure 6:
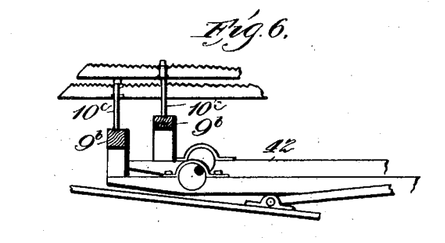
Fig. 6 is a sectional view illustrating a modification of a rake and beater mechanism.

In Fig. 6 I illustrate a modification of the rake and beater mechanism. In this case all the rake and beater bars are attached to cross-bars 9ᵇ and supported by fingers 10ᶜ, as before. The cross-bars are in turn supported upon longitudinal bars 42, with which the rotary shafts and eccentrics are directly connected.

What I claim is—

1. The improved rake and beater mechanism comprising two similar frames, each consisting of a series of horizontal longitudinal bars, transverse or cross bars connecting such longitudinal bars, and rotary shafts each provided with two sets of eccentrics, the respective sets being connected with the respective frames at the outer sides of same, substantially as described.

2. The improved rake and beater mechanism comprising two like frames each composed of a series of horizontal longitudinal bars, cross-bars connecting the same and supporting the bars intermediate the two outer ones, two transverse rotary shafts, eccentrics mounted thereon and engaging the two outer longitudinal bars of the respective frames, the eccentrics of each pair being projected in opposite directions, whereby rotary motion is imparted to the respective frames oppositely substantially as shown and described.

3. The improved rake and beater mechanism comprising two like frames each comprising two outer longitudinal bars and a series of thinner intermediate bars, cross-bars connecting the two outer bars and being secured to the under sides of the same, the inner bars being supported upon and rigidly attached to the said cross-bars, a crank mechanism for imparting the required movements to the two frames independently and simultaneously substantially as shown and described.

4. In rake and beater mechanism of the class described the combination with the two like but independent frames each comprising two outer relatively large bars, cross-bars attached to the under side of the same and rigidly connecting them, a series of smaller bars arranged parallel to the first outer ones, and fingers secured to the several cross-bars and having shoulders and a vertical extension on the side of the bars to which they are secured, substantially as shown and described.

5. In rake and beater mechanism of the class described, the combination with longitudinal toothed bars of bifurcated fingers whose forked members extend up on both sides of the longitudinal bars to which they are secured, substantially as shown and described.

6. In rake and beater mechanism the combination with a series of longitudinal toothed bars and cross-bars arranged beneath them of a series of supports or fingers which are rigidly secured to the cross-bars and have their upper portions bifurcated to embrace the bars and nuts applied to the joined ends of the fork, substantially as shown and described.

7. In rake and beater mechanism the combination with supporting cross-bars and a series of longitudinal bars of supporting fingers or posts whose upper portions are bifurcated to embrace the longitudinals bars, means for securing and clamping the upper ends of the forks and washers applied between the bars and the shoulders of the fork, substantially as shown and described.

8. In the improved rake and beater mechanism, consisting of two coöperative companion frames each frame consisting of a pair of outer longitudinal toothed bars, connecting and supporting cross-bars attached to the under side of the same said cross-bars being provided with a series of vertical holes for receiving and holding rakes and rake-holding fingers properly spaced in their proper positions, and a series of intermediate but smaller longitudinal bars arranged parallel to said outer bars, and a series of posts or fingers having threaded shanks which pass through the holes in the cross-bars, and nuts applied above and below the cross-bars, whereby the thinner bars are supported rigidly and adapted for vertical adjustment as described.

9. The combination, with the longitudinal toothed bars of plates secured to the sides thereof and projecting above the same, the said plates being sloped and notched on their front upper edge and extended horizontally at the top whereby they are adapted to raise the mingled straw and grain and to temporarily support the same while moving rearward onto the rakes proper, substantially as described.

10. The combination with the longitudinal toothed rake and beater bars and means for imparting vertical and endwise motion thereto of the overhead beater composed of a series of parallel slats and means for suspending the same whereby they constitute a floor but are adapted for individual movement vertically, substantially as shown and described.

11. The combination with the longitudinal toothed bars and means for imparting a vertical and endwise motion thereto of the overhead beater comprising a series of toothed bars arranged parallel to each other and aprons which are slitted to form strips, the latter being secured to the individual slats, and rollers and ratchet-and-pawl mechanism for adjusting and securing the overhead beater at different elevations and inclinations, substantially as shown and described.

12. The improved overhead beater comprising a series of parallel slats, parallel horizontal shafts or rollers and means for supporting the slats and allowing individual movement vertically, the same consisting of aprons depending from the rollers, substantially as shown and described.

13. The combination with the rake and beater mechanism of the endless conveyer arranged beneath the same and grain-boards provided with tapered fingers and arranged beneath the upper and lower bights of the conveyer and parallel thereto, substantially as shown and described.

14. The combination, with a series of sieves arranged stepwise as described, of a grain-board arranged in a higher plane and provided with tapered fingers which extend over the series of sieves, substantially as described.

FRANK FREDEEN.

Witnesses:
SOLON C. KEMON,
AMOS W. HART.